United States Patent
Shami (10) Patent No.: US 9,639,818 B2
(45) Date of Patent: *May 2, 2017

(54) CREATION OF EVENT TYPES FOR NEWS MINING FOR ENTERPRISE RESOURCE PLANNING

(71) Applicant: Mohammad Shami, Sunnyvale, CA (US)

(72) Inventor: Mohammad Shami, Sunnyvale, CA (US)

(73) Assignee: SAP SE, Walldorf (DE)

( * ) Notice: Subject to any disclaimer, the term of this patent is extended or adjusted under 35 U.S.C. 154(b) by 466 days.

This patent is subject to a terminal disclaimer.

(21) Appl. No.: 14/015,779

(22) Filed: Aug. 30, 2013

(65) Prior Publication Data

US 2015/0066552 A1   Mar. 5, 2015

(51) Int. Cl.
G06F 17/30 (2006.01)
G06Q 10/06 (2012.01)

(52) U.S. Cl.
CPC .................. *G06Q 10/0631* (2013.01)

(58) Field of Classification Search
CPC ................. G06F 17/3071; G06F 17/30312
USPC ........................................................ 707/737
See application file for complete search history.

(56) References Cited

U.S. PATENT DOCUMENTS

| 6,438,543 | B1 | 8/2002 | Kazi et al. |
| 6,556,951 | B1* | 4/2003 | Deleo ................... G06F 19/363 702/182 |
| 7,315,861 | B2 | 1/2008 | Seibel et al. |
| 7,330,850 | B1 | 2/2008 | Seibel et al. |
| 7,370,316 | B2 | 5/2008 | Kraiss et al. |
| 7,783,629 | B2* | 8/2010 | Li ..................... G06F 17/30616 707/723 |
| 8,832,105 | B2 | 9/2014 | Punera et al. |
| 2003/0220747 | A1* | 11/2003 | Vailaya ............. G06F 17/30569 702/19 |
| 2003/0220895 | A1* | 11/2003 | Vailaya ............. G06F 17/30699 |
| 2005/0108630 | A1 | 5/2005 | Wasson |
| 2005/0278321 | A1* | 12/2005 | Vailaya ............. G06F 17/30864 |
| 2006/0112110 | A1 | 5/2006 | Maymir-Ducharme et al. |
| 2008/0109399 | A1* | 5/2008 | Liao ................... G06F 17/30719 |
| 2008/0133479 | A1* | 6/2008 | Zelevinsky ......... G06F 17/3071 |

(Continued)

FOREIGN PATENT DOCUMENTS

WO   2009097558 A2   8/2009

*Primary Examiner* — Baoquoc N To
(74) *Attorney, Agent, or Firm* — Brake Hughes Bellermann LLP (57) ABSTRACT

An event type generator may provide a training set for classifying documents with respect to an event type. The event type generator may include a request handler to receive the event type and at least one example document, a text analyzer to extract first entities from the at least one example document, and a result manager to execute a first search against an indexed corpus of documents, to obtain first search results, and further to receive at least one selected document from the first search results. The request handler may extract second entities from the at least one selected document, and execute a second search against the indexed corpus of documents, to obtain second search results. The event type generator may thus provide the at least one example document, the first search results, and the second search results as the training set.

15 Claims, 8 Drawing Sheets

(56) References Cited

U.S. PATENT DOCUMENTS

| | | |
|---|---|---|
| 2009/0222395 A1 | 9/2009 | Light et al. |
| 2009/0307214 A1* | 12/2009 | Yoshida ............ G06F 17/30312 |
| 2011/0029529 A1* | 2/2011 | Knight .............. G06F 17/30713 |
| | | 707/737 |
| 2012/0102031 A1 | 4/2012 | Shami et al. |
| 2013/0124545 A1 | 5/2013 | Holmberg et al. |
| 2013/0297361 A1 | 11/2013 | Shami et al. |
| 2013/0297634 A1 | 11/2013 | Shami et al. |
| 2014/0082003 A1 | 3/2014 | Feldman et al. |
| 2014/0136188 A1 | 5/2014 | Wroczynski et al. |
| 2015/0066552 A1* | 3/2015 | Shami ................ G06Q 10/0631 |
| | | 705/7.12 |

* cited by examiner

Date : 19960913 　　　　　　　　　　　　　　　　　　　　　　　　　　　　　　　602
title : NETHERLANDS: WASHED UP CANISTERS TRIGGER DUTCH POISON SCARE.
Surface:
About 50 containers of aluminium phosphate have been found on the northern Dutch coast, prompting
fears of a poison spill in the North Sea, the Dutch coast guard said on Friday.
"We've found about 50 small tubes with the chemical inside them. None were open, but there's always a
risk that some of the poison could have escaped," a coastguard spokesman said.
Aluminium phosphate is used as rat poison and produces a toxic gas on exposure with water, the
spokesman said. The containers, aluminium tubes 15 centimetres long by six wide, have so far only
been discovered on the shores of the Wadden Sea islands off the northern Dutch coast, but the
German Environmental Ministry has also expressed fears of contamination of German beaches.
The origin of the tubes also remains a mystery, but it is believed they spilled from a chemical tanker in
the North Sea.
"We're trying to locate where they're from, but we have no clues at the moment," the coastguard
spokesman said.
The Dutch response so far has been to search beaches and place warnings at beach entrances.
-- Amsterdam newsroom +31 20 504 5000, Fax +31 20 504 5040
Finished printing Example document
found 55 similar articles ..
　is potentially similar to　　　　　　 ← 310

Date : 19961120
title : JORDAN: Jordanian lovers to hang for rat poison murder.
　is potentially similar to　　　　　　　　　　　　 ← 308

Date : 19970330
title : HONG KONG: Rat poison kills child, sickens 60 in China - paper.
　is potentially similar to
　　　　　　　　　　　　　　　　　　　← 312

Date : 19970331
title : HONG KONG: Food poisoning takes toll in southern China.
　is potentially similar to　　　　　　　 ← 604

Date : 19970324
title : SINGAPORE: SML orders two tankers for US$72 mln.
　is potentially similar to
　　　　　　　　　　　　← 606
Date : 19960911
title : GERMANY: Scientists find new rhodium mineral in Serbia.　　　　　　　　　　　　600
　is potentially similar to
　　　　　　　　　　　　← 314
Date : 19970322
title : CANADA: Montreal ammonia leak sends 15 to hospital.
　is potentially similar to
　　　　　　　　　　　　← 306
Date : 19970118
title : UK: Tankers collide off French coast.　　　　　　　　　　　　　　FIG. 6
　is potentially similar to
　　　　　　　　　　　　← 608
Date : 19970120
title : UK: Holed gasoline tanker chartered to George E Warren.
　is potentially similar to
　　　　　　　　　　　　← 610
Date : 19970122
title : MALAYSIA: Malaysia awards shipbuilding contract to Japan.

FIG. 7

| Supplier | At least Type | Date | Description |
|---|---|---|---|
| Company A | KPI: Delivery | | |
| | | | |
| | | | |

Av Lead Time (Days)

CREATION OF EVENT TYPES FOR NEWS MINING FOR ENTERPRISE RESOURCE PLANNING

TECHNICAL FIELD

This description relates to enterprise resource planning software.

BACKGROUND

Many businesses have a large number of business partners and associated business relationships. These business relationships may be complex and diverse, and may be affected by a large number of potentially interrelated circumstances.

Consequently, many types of disruptions may occur in the context of such business relationships, and such disruptions may have numerous and far-reaching consequences. For example, a manufacturing business may find that a disruption experienced by a supplier in its supply chain results in significant delays of one or more manufacturing processes. Such delays, in turn, may result in lost profits and/or reduced customer satisfaction for the manufacturing business.

However, particularly for businesses having large numbers of the type of complex, diverse business relationships referenced above, it may be difficult to maintain an awareness of such disruptions, or potential disruptions. As a result, businesses may lack awareness of past and current circumstances of its business partners, thereby making it difficult to make informed decisions with respect to the associated business relationships.

SUMMARY

According to one general aspect, a system may include instructions recorded on a non-transitory computer-readable medium, and executable by at least one processor. The system may include an event type generator configured to cause the at least one processor to provide a training set for training a supervised machine learning algorithm to classify documents with respect to an event type. The event type generator may include a request handler configured to receive the event type and at least one example document designated as being associated with the event type, a text analyzer configured to extract first entities from the at least one example document, and a result manager configured to execute a first search against an indexed corpus of documents, using the first entities, to obtain first search results, and further configured to receive at least one selected document from the first search results. The request handler may be further configured to extract second entities from the at least one selected document, and execute a second search against the indexed corpus of documents, using the second entities, to obtain second search results. The event type generator may be further configured to provide the at least one example document, the first search results, and the second search results as the training set.

According to another general aspect, a computer-implemented method for executing instructions stored on a computer readable storage medium may include receiving an event type and at least one example document designated as being associated with the event type, extracting first entities from the at least one example document, and executing a first search against an indexed corpus of documents, using the first entities, to obtain first search results. The method may further include receiving at least one selected document from the first search results, extracting second entities from the at least one selected document, and executing a second search against the indexed corpus of documents, using the second entities, to obtain second search results. The method may further include providing the at least one example document, the first search results, and the second search results as a training set for training a supervised machine learning algorithm to classify documents with respect to the event type.

According to another general aspect, a computer program product may be tangibly embodied on a non-transitory computer-readable storage medium and may include instructions that, when executed by at least one processor, are configured to receive an event type and at least one example document designated as being associated with the event type, extract first entities from the at least one example document, and execute a first search against an indexed corpus of documents, using the first entities, to obtain first search results. The instructions, when executed, may further receive at least one selected document from the first search results, extract second entities from the at least one selected document, and execute a second search against the indexed corpus of documents, using the second entities, to obtain second search results. Thus, the instructions, when executed, may provide the at least one example document, the first search results, and the second search results as a training set for training a supervised machine learning algorithm to classify documents with respect to the event type.

The details of one or more implementations are set forth in the accompanying drawings and the description below. Other features will be apparent from the description and drawings, and from the claims.

BRIEF DESCRIPTION OF THE DRAWINGS

FIG. 6 is an example of a news article that may be utilized by the system of FIG. 1, together with corresponding search results, which may be used to generate the search result graph of FIG. 3.

DETAILED DESCRIPTION

Figure 1:
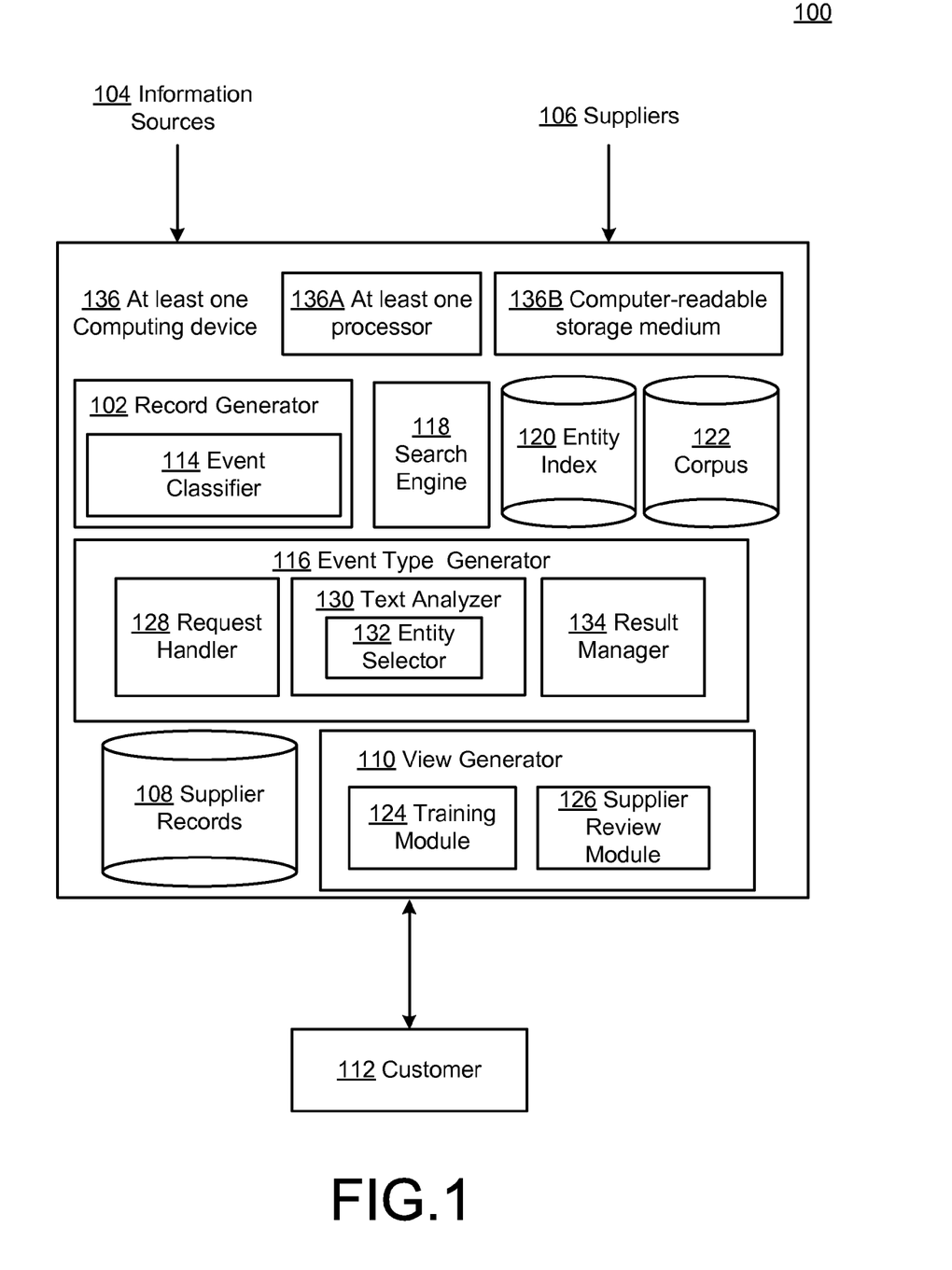
FIG. 1 is a block diagram of a system for news mining for enterprise resource planning.

FIG. 1 is a block diagram of a system 100 for creating event types for news mining for enterprise resource planning. In the example of FIG. 1, a record generator 102 utilizes a plurality of information sources 104 to determine relevant information regarding a plurality of suppliers 106. The record generator 102 may thus populate a database of supplier data records 108. Due to the resulting structured storage format of the supplier records 108, a view generator 110 may be enabled to provide a customer 112 with information regarding the suppliers 106. In this way, the customer 112 may be provided with accurate, relevant, complete, and timely information regarding some or all of the suppliers 106, so that, as a result, the customer 112 is provided, in a convenient manner, with the ability to make informed business decisions.

As described in detail below, the record generator 102 may be configured to process very large volumes of documents from the information sources 104, even when such documents are unstructured, or structured in a highly heterogeneous fashion with respect to one another. In particular, the record generator 102 may be configured to implement various types of supervised machine-learning, which provides for the type of fast, accurate, complete results referenced above, with a minimum of requirements for detailed and/or expert human involvement on the part of the customer 112 or other user. Moreover, as also described below, the record generator 102 in such example implementations provides for dynamic, adaptive processing of documents received from the information sources 104, so that the supplier records 108 are provided in a manner which, over time, is highly likely to reflect the needs and desires of the customer 112.

The information sources 104, as just referenced, may represent a large and diverse collection of information sources. For example, the information sources 104 may include traditional news outlets, such as newspapers, magazines, journals, or other periodicals. More generally, the information sources 104 may represent virtually any source of information that is accessible by way of a connected computer network, such as, e.g., the public internet. Thus, for example, the information sources 104 may include a company website, a personal blog, a bulletin board or Twitter account, other social media channels, or virtually any accessible website.

With the above description of the information sources 104, which should be understood to be representative, non-limiting, and non-exhaustive, it may be appreciated that documents received from the information sources 104 may include virtually any discrete quantity of information obtained from one or more of the information sources 104. Thus, such documents may include, e.g., traditional news articles, company press releases, blog entries, Tweets, bulletin board postings, or virtually any other current or future type of communication item that may be network-accessible.

As just referenced, the information sources 104, and thus the various types of documents obtained therefrom, may vary greatly. Consequently, it may be appreciated that the various techniques utilized by the record generator 102 in obtaining such documents from the information sources 104 may vary greatly, as well. For example, the record generator 102 may obtain documents from the information sources 104 by subscribing to various news channels. In other examples, the record generator 102 may actively crawl specifically-identified websites in order to obtain information therefrom. The record generator 102 also may execute, or may cause to be executed, searches of specifically-identified websites or databases that have been identified as potentially including relevant or desired information. Thus, other known or future example techniques for collecting documents from the various information sources 104 would be apparent, and are therefore not discussed here in greatly detail, except as may be necessary or helpful in understanding operations of the system 100 of FIG. 1.

In operation, as referenced above, the record generator 102 is thus configured to utilize any such appropriate technique to collect documents which may be relevant to the suppliers 106. In this regard, it may be appreciated that the suppliers 106 may represent virtually any company or other entity which contributes to, or is otherwise relied upon, or potentially relied upon, by the customer 112. Thus, for example, the suppliers 106 may represent producers of goods and/or services which are consumed by the customer 112 as part of efforts of the customer 112 to provide one or more products for sale which are aggregated, manufactured, or otherwise produced using the goods/services of the suppliers 106.

In specific implementations described herein for the sake of example, the suppliers 106 may be referred to as providing physical goods which are shipped to one or more locations associated with the customer 112, for manufacture or assembly thereof into a physical product to be sold by the customer 112. However, as just referenced, the suppliers 106 should be understood in the general context of any entity which provides one or more goods or services to the customer 112, and which the customer 112 relies upon for successful operation of associated business (or other) activities.

Thus, the customer 112 should be understood to represent virtually any entity, or individual representative, employee, or agent thereof, which relies upon the suppliers 106 for successful completion of associated activities. Thus, for example, the customer 112 may represent a business which purchases, and receives shipment of, various physical goods from the suppliers 106. In more specific examples, the customer 112 may represent an individual acting on behalf of such an entity, who is responsible for monitoring activities of the suppliers 106 which might negatively or positively impact related operations for which such an individual is responsible.

In practice, the customer 112 may be responsible for monitoring and evaluating a large number of the suppliers 106. Moreover, it may be appreciated that one or more the suppliers 106 may also rely upon suppliers of its own for successful production of goods and/or services to be consumed by the customer 112 (e.g., the suppliers 106 may represent, or be associated with a multi-tiered network of suppliers). In the system 100, the customer 112 is nonetheless provided with an ability to effectively monitor the suppliers 106, as well as events which might impact relevant operations of the suppliers 106, so that the customer 112 may make informed decisions regarding current and future interactions with the suppliers 106.

Specific examples of techniques used by the customer 112 in evaluating the suppliers 106 are provided below with respect to the continuing description of the system 100 of FIG. 1, as well as, e.g., with respect to FIGS. 8 and 9. However, generally speaking, and as referenced above, the record generator 102 enables such informed decision making by the customer 112 with respect to the suppliers 106, by, e.g., intelligently identifying potentially relevant information concerning individual ones of the suppliers 106, and thereafter creating the supplier records 108 in a manner which facilitates utilization thereof by the customer 112, by way of the view generator 110.

Thus, the record generator 102 is configured to utilize a large number of various types of documents from the various information sources 104, to thereby create the supplier records 108 with respect to individual ones of the suppliers 106. In the example of FIG. 1, the record generator 102 includes an event classifier 114 that may be configured to analyze received documents, to thereby label each individual document in accordance with one or more of a number of predetermined event types. In this regard, it may be appreciated that such events refer to virtually any event which may impact an ability of one of the suppliers 106 to fulfill its current or future obligations to the customer 112. By way of example, such events may include natural disasters, government regulations, shipping company strikes, and various other types of events which may be considered likely to affect multiple companies (including at least one of the suppliers 106) within a particular geographical region and/or within a particular industry. Other types of events may be more specific to individual ones of the suppliers 106, such as, for example, product recalls, present or threatened litigation, purchase or sale of a supplier (or of a division or subsidiary thereof), change in management, or many other types of events which would be apparent, some of which are mentioned below for the sake of further example.

The events may be classified according to a predetermined event model. For example, such an event model may classify various types of events as positive, negative, or indeterminate. A model may classify events according to a classification scheme in which events may have related or subtypes of events (for example, a natural disaster event may have sub-events of flood, tornado, hurricane, or earthquake).

The event classifier 114 may be implemented using a supervised machine-learning algorithm, as described in detail below with respect to FIGS. 4 and 5. Accordingly, the event classifier 114 may quickly, efficiently, and accurately, and in a dynamic and adaptive manner, classify received documents, to thereby provide one or more labels to each such document, in accordance with the predetermined event model.

The record generator 102 should be understood to include and provide a number of additional or alternative features related to the above-described functionalities, which are not necessarily described herein in detail. For example, the record generator 102 may include a document fitness analyzer configured to perform an initial analysis and filtering of individual documents obtained from the information sources 104. A supplier query generator may receive each labeled, classified document from the event classifier 114, and may thereafter query each such document to determine potential matches of terms contained therein with individual ones of the suppliers 106. A supplier match analyzer may be configured to analyze each such potential supplier match identified by the supplier query generator to thereby determine a confidence level with respect to whether each such potential match actually corresponds to a reference to the identified supplier. Such a supplier match analyzer may thus provide labeled, classified documents which include confirmed supplier matches, e.g., to a supplier relevance analyzer. The supplier relevance analyzer may be configured to determine an extent to which each matched supplier is relevant to one or more of the classified events.

Using these and additional or alternative capabilities, the record generator 102 may proceed to populate the supplier records 108. The supplier records 108 thus contain individual records which provide specific types of useful information with respect to individual suppliers, in a manner which enables the customer 112 to evaluate individual suppliers both individually and with respect to one another.

As referenced above, the event classifier 114 may be implemented using a supervised machine-learning algorithm. Again, such details are described below, e.g., with respect to FIGS. 4 and 5. In general, though, the supervised machine learning algorithm enables classification or labeling of a newly-received document from information sources 104, according to a pre-determined event model. For example, as described, a newly-received document may be accurately classified as having a classification corresponding to an event type of "natural disaster."

The event model may have an appropriately large number of event types, and may thereby classify received documents in an accurate and specific manner. Nonetheless, it may occur that the customer 112 may desire to create a new event type, so that received documents may thereafter be labeled, when appropriate, with the created event type.

Consequently, an event type generator 116 is utilized which is configured to assist the customer 112, even when the customer 112 is a non-technical or non-expert user, in quickly and easily creating a new event type. As described in detail below, the event type generator 116 may be configured to utilize an example document provided by the customer 112 to facilitate creation of a new event type, which may thereafter be used subsequently to classify documents from the information sources 104 with respect to the created event type.

More specifically, in response to identification of an event type to be created, and receipt of an associated example document from the customer 112, the event type generator 116 may utilize a specialized search engine 118, which leverages an entity index 120 to interact with a corpus of documents 122. That is, the corpus 122 represents a collection of documents, where the documents have been selected to be representative of, and related to, e.g., the various suppliers 106, related industries, and/or related events (for example, the corpus 122 may include documents received from the information sources 104). Then, the event type generator 116 may utilize the search engine 118 to select a subset of documents from the corpus 122 to use in training a supervised machine learning algorithm of the event classifier 114, to thereby classify received documents with respect to the newly-created event type.

In this context, the term 'entity' refers generally to individual words or word groupings within documents, e.g., within documents of the corpus 122, which represent, e.g., atomic text elements referring to a single concept and/or individual item or thing within a category. For example, such an entity may include one or more noun phrases, in which, e.g., a noun and its associated modifier(s) serve as a subject or object within a sentence. Other such entities may include, e.g., verb phrases, persons, places, and virtually any other concept or element which may be extracted from the text of a document. Such entities may be identified, for example, using Text Analysis, Linguistic Analysis, and/or Natural Language Processing techniques. Additional techniques for identifying and selecting such entities are discussed in more detail, below, e.g., with respect to specific examples in which the entities are noun phrases.

In general, the event type generator 116 may implement an iterative process in which a new event type and associated example document are received, appropriate entities, e.g., noun phrases are extracted, and the identified entities are used by the search engine 118 to identify (using the entity index 120) corresponding search results from within the corpus 122. Then, the customer 112 may select from among these search results, and the process may repeat in an iterative fashion by extracting entities from the selected search results and applying these against the corpus 122. This iterative process may continue, e.g., until a desired number of documents have been obtained, a maximum number of iterations has been performed, and/or no further search results can be obtained.

The result of this iterative process will thus be a set of documents from the corpus 122, and this set of documents may be used as a training set in training a supervised machine learning algorithm of the event classifier 114 to classify received documents with respect to the new, created event type. Details of such training are provided below, e.g., with respect to FIGS. 4 and 5.

With respect to FIG. 1, the view generator 110 is illustrated as including a training module 124 which may be used to execute the individual training and use of the supervised machine-learning algorithm implemented by the event classifier 114. The training module 124 allows for the input or other identification of example information to be provided for the supervised machine-learning algorithm. For example, the customer 112 may utilize the training module to provide the original example document, and to select from among provided search results to obtain a final training set of documents. For purposes of FIG. 1, it may be appreciated that the view generator 110, i.e., the training module 124, may be configured to provide all necessary user interfaces and associated logic for interacting with the customer 112 for the purpose of executing at least a portion of such training.

The view generator 110 is also illustrated as including a supplier review module 126. As described and illustrated below, e.g., with respect to FIGS. 8 and 9, the supplier review module 126 enables the customer 112 to utilize the supplier records 108 in a highly intuitive and useful manner. For example, the supplier review module 126 may enable the customer 112 to review an individual supplier to determine whether recent, relevant events are likely to have an impact on a performance of that supplier. In other examples, the supplier review module 126 may enable the customer 112 to compare a performance of a specific supplier against one or more other suppliers within a relevant industry. In this way, for example, the customer 112 may evaluate each supplier in the context of all similar suppliers used by the customer 112, and/or against other suppliers who are being evaluated for potential future use by the customer 112. In FIG. 1, such evaluation of suppliers 106 may occur with respect to virtually any event type that is specified by the customer 112.

By way of further detail with respect to the event type generator 116, and specifically with respect to the iterative process described above for selecting a training set of documents from the corpus 122, the event type generator 116 is illustrated as including a request handler 128, a text analyzer 130 (and associated entity selector 132), and a result manager 134. The request handler 128 may be configured to receive the original example document, e.g., by way of an appropriate graphical user interface provided by the training module 124. The text analyzer 130 may be configured to identify entities, (e.g., noun phrases and/or other entities or information) within documents received by way of the request handler 128.

Then, the entity selector 132 may be configured to process and otherwise analyze the resulting entities to obtain resulting selected entities that the result manager 134 may then provide to the search engine 118 for application against the corpus 122. The result manager 134 and the request handler 128, again perhaps in cooperation with the training module 124, may then provide the search results and receive selections of the customer 112 therefrom, so that iterations may continue with analysis of the selected search results by the text analyzer 130.

Further details with regard to the text analyzer 130 are provided below. Also, the event type generator 116 may be configured to index the example document, and other documents, for inclusion within the index 120, so that such indexed documents will be available for future use of the event type generator 116 (e.g., for creation of a second, subsequent new event type).

In the example of FIG. 1, the record generator 102, the supplier records 108, the view generator 110, the event type generator 116, the search engine 118, the index 120, and the corpus 122 are illustrated as being implemented using at least one computing device 136. As shown, the at least one computing device 136 may include or utilize at least one processor 136A and computer readable storage medium 136B. Thus, for example, it may be appreciated that the record generator 102 and the view generator 110 may be implemented using the at least one processor 136A, based on instructions stored using the computer readable storage medium 136B. Meanwhile, the supplier records 108 also may be stored using the computer readable storage medium 136.

Of course, the at least one computing device 136 is intended merely to provide a high-level, representative, and non-limiting example for implementation of the system 100. For example, it may of course be appreciated that the at least one computing device 136 will include many components and features not specifically illustrated in the example of FIG. 1, such as various appropriate input/output devices, power sources, and network interfaces. Further, any individual component of FIG. 1 should be understood to potentially represent two or more such components. For example, multiple computing devices in communications with one another may be utilized to implement individual ones of the record generator 102, the view generator 110, the event type generator 116, or components thereof. Similarly, a plurality of processors and/or computer readable storage media may be used, as appropriate.

Similarly, for example, any individual module of the record generator 102, the view generator 110, and/or the event type generator 116 may be implemented using two or more sub-modules. Conversely, any two modules of the record generator 102, the supplier records 108, the view generator 110, the event type generator 116, the search engine 118, the index 120, and the corpus 122 may be combined for implementation in a single module, as would be appropriate for particular implementations of the system 100.

Figure 2:
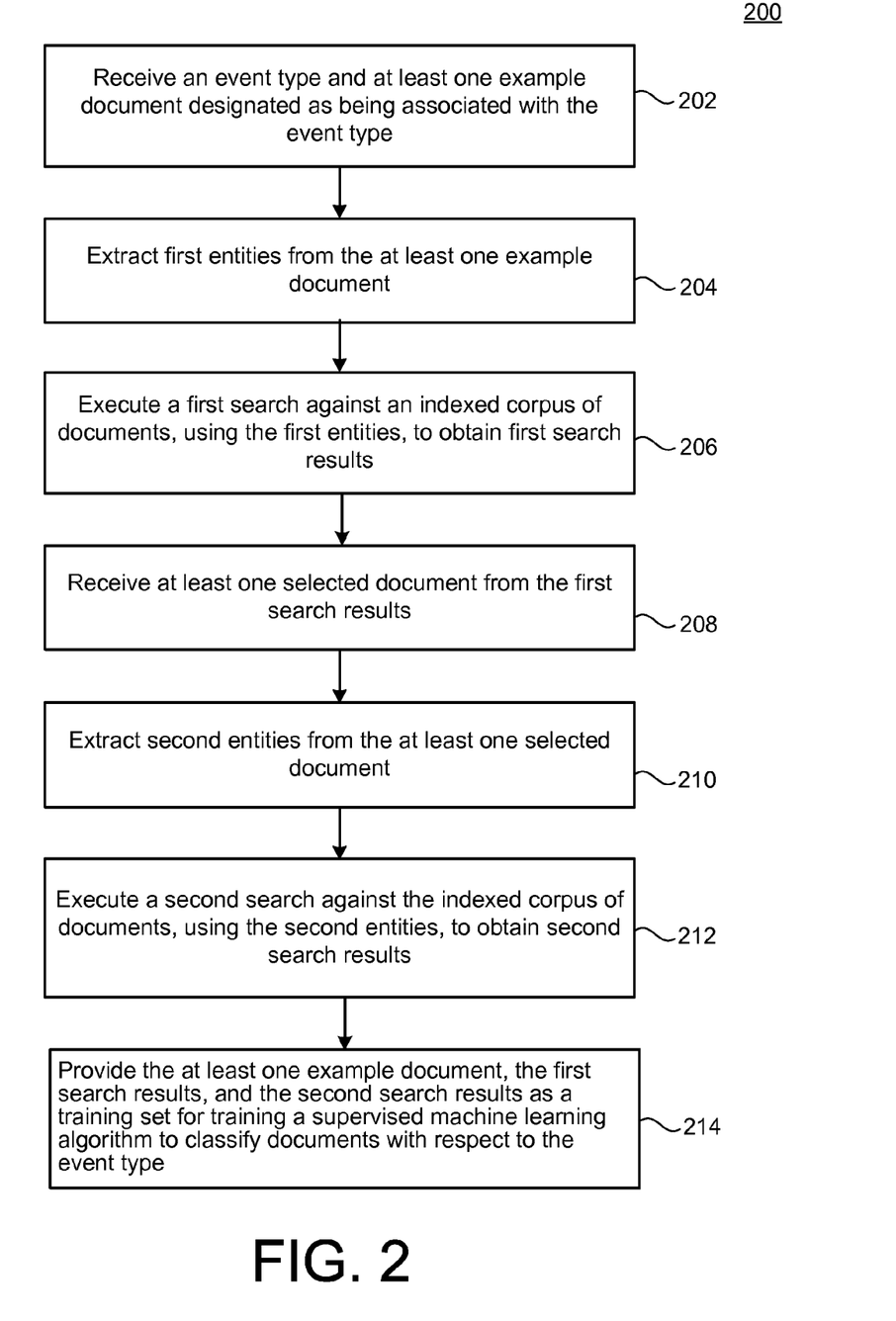
FIG. 2 is a flowchart illustrating example operations of the system of FIG. 1.

FIG. 2 is a flowchart 200 illustrating example operations of the system 100 of FIG. 1. In the example of FIG. 2, operations 202-212 are illustrated as separate, sequential operations. However, it may be appreciated that any two or more of the operations 202-212 may be implemented in a partially or completely overlapping or parallel manner, or in a nested, iterative, looped, or branched manner. Moreover, one or more additional or alternative operations may be included in some embodiments, while, in other example embodiments, one or more operations may be omitted.

In the example of FIG. 2, an event type and at least one example document designated as being associated with the event type may be received (202). For example, the request handler 128 may receive a designation of a new event type to be included in an event model used by the event classifier 114. In detailed examples provided below, e.g., with respect to FIGS. 3, 6, and 7, the customer 112 may wish to create a new event type named "environmental toxins," which is desired to be used to classify documents describing environmental toxins which are caused by, and/or which affect, suppliers of the suppliers 106. Consequently, the customer 112 may utilize appropriate graphical user interface(s), supplied by the view generator 110 and/or the request handler 128, to submit this new event type, and also to submit an example document related to the new event type.

First entities may be extracted from the at least one example document (204). For example, the text analyzer 130 may extract entities, e.g., noun phrases, from the example document, and the entity selector 132 may analyze such resulting noun phrases to retain noun phrases having characteristics useful in searching the corpus 122. For example, the entity selector 132 may remove (or not retain) entities which identify concrete, specific individuals or locations, and/or which are expressed as single words. Thus, for example, the entity selector 132 may retain noun phrases or other entities which correspond to more abstract, descriptive, and/or characteristic, representative, and/or illustrative concepts existing within the example document. Specific examples of more detailed operations of the entity selector 132 are provide below with respect to FIG. 7.

A first search may be executed against an indexed corpus of documents, using the first entities, to obtain first search results (206). For example, the result manager 134 may be configured to cause the search engine 118 to search the corpus 122, using the entity index 120. As referenced above, and described in more detail below, the entity index 120 itself represents an indexing of documents within the corpus 122 using the same type(s) of entities, e.g., noun phrases, extracted from individual ones of the documents during the indexing process. Therefore, the search engine 118 may execute an effective search of the corpus 122, to thereby return first search results which are likely to be highly similar in content to the example document (i.e., in the example implementation, which relate to "environmental toxins"). Such search results may then be provided to the customer 112, e.g., by way of the result manager 134 and view generator 110. Examples of such search results are illustrated and described with respect to FIG. 3.

At least one selected document may be received from the first search results (208). For example, the result manager 134 may receive selections of one or more of the first search results as displayed to the customer 112. That is, the customer 112 will select those provided documents from the first search results which the customer 112 considers to be most relevant or useful for inclusion with respect to the new event type to be created.

Second entities may thus be extracted from the at least one selected document (210). For example, the text analyzer 130 and the entity selector 132 may essentially repeat the process described above with respect to the example document, but this time with respect to the selected document(s) from the first search results.

Consequently, a second search may be executed against the indexed corpus of documents, using the second entities, to obtain second search results (212). For example, again, the result manager 134 may cause the search engine 118 to search the corpus 122, using the entity index 120, and using the second entities as search terms.

In this way, the at least one example document, the first search results, and the second search results may be provided as a training set for training a supervised machine learning algorithm to classify documents with respect to the event type (214). For example, the training module 124 may be used to train the event classifier 114 so that the new event type is included in an event model used by the event classifier 114 to classify received documents from the information sources 104.

As referenced above, FIG. 2 represents a simplified, conceptual view of basic concepts and processes that may be implemented by the system 100 of FIG. 1. In practice, as shown in more detail with respect to FIG. 7, the processes of FIG. 2 may continue in an iterative fashion, so as to include third, fourth, or higher selected search results.

Figure 3:
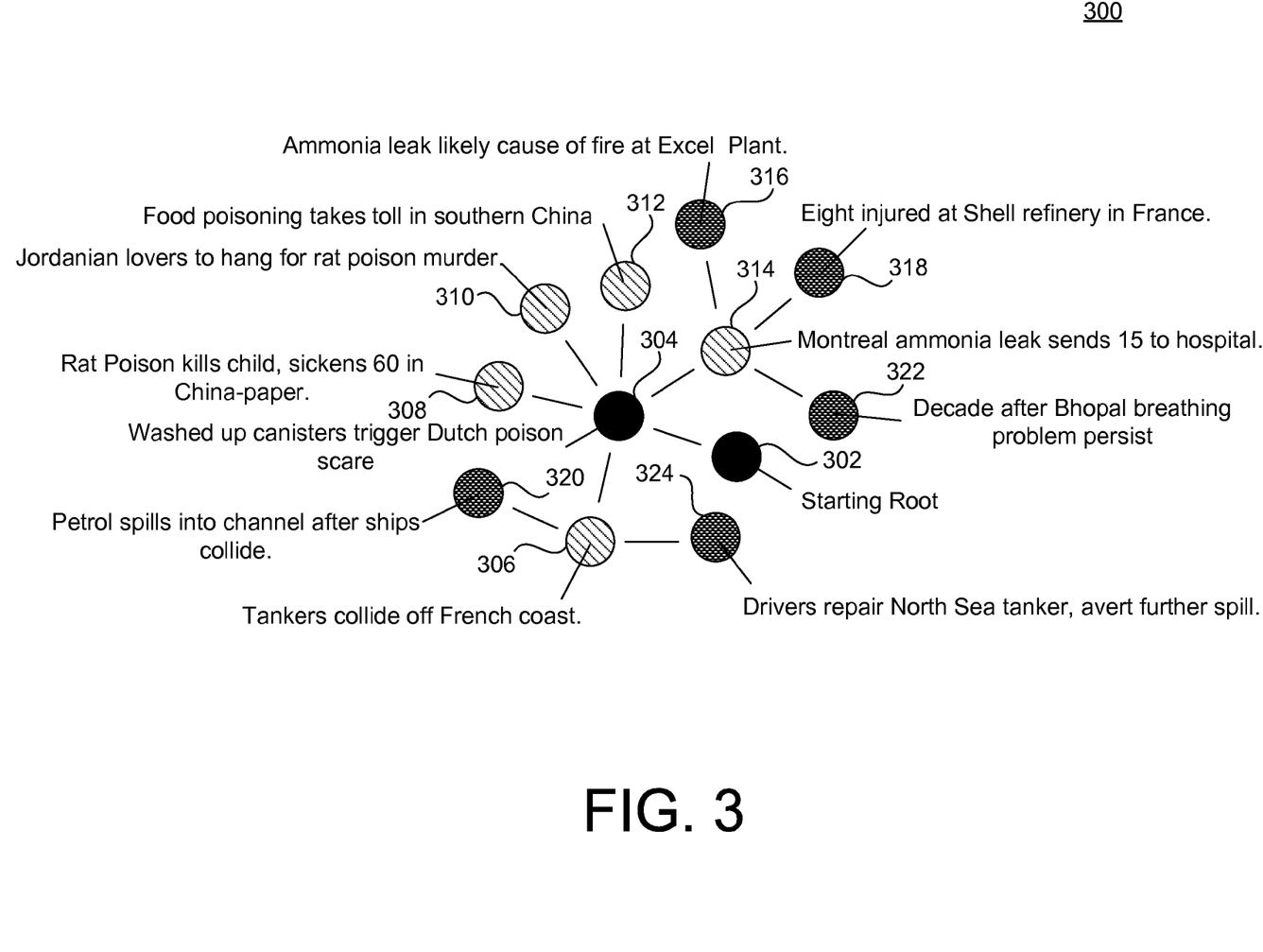
FIG. 3 is a search result graph illustrating search results generated using the techniques of FIGS. 1 and 2.

FIG. 3 is a search result graph 300 illustrating search results generated using the techniques of FIGS. 1 and 2. In the example of FIG. 3, a starting root node 302 represents a first node of the graph 300, and is thus connected to a node 304 representing an example document provided by the customer 112, as outlined above with respect to FIGS. 1 and 2. In the example of FIG. 3, which continues the example above in which the new event type being created is "environmental toxins," the example document is identified by its title of "Washed up canisters trigger Dutch poison scare."

In FIG. 3, extracted entities are assumed for the sake of the example to include noun phrases. Thus, as described above, noun phrases may be extracted from this example document to use in searching the corpus 122, thereby resulting in first search results. In FIG. 3, the first selected search results from among these first search results are illustrated with respect to nodes 306 ("Tankers collide off French coast"), 308 ("Rat Poison kills child, sickens 60 in China-paper."), 310 ("Jordanian lovers to hang for rat poison murder."), 312 ("Food poisoning takes toll in southern China"), and 314 ("Montreal ammonia leak sends 15 to hospital."). That is, search results 306-314 represent a remaining subset of documents selected by the customer 112 from among all originally-included documents in the first search results (in other words, non-selected documents from the first search results are not illustrated in FIG. 3).

Then, second noun phrases may be extracted from the first selected search results 306-314, and thereafter applied against the corpus 122 to obtain second search results. From among these, the customer 112 is illustrated as having selected documents corresponding to nodes 316 ("Ammonia leak likely cause of fire at Excel Plant."), 318 ("Eight injured at Shell refinery in France."), 320 ("Petrol spills into channel after ships collide."), 322 ("Decade after Bhopal breathing problem persist"), and 324 ("Drivers repair North Sea tanker, avert further spill."), to be included as selected second search results.

Thus, in the example, all of documents 304-324 constitute a training set which may be used to train the event classifier 114 to classify received documents with respect to the new event type "environmental toxins." As may be observed, in the graph, the node 304 for the example document is connected to each of nodes 306-314 representing the first search results. Meanwhile, each node 306-314 is connected individually to corresponding ones of nodes 316-324; i.e., are each linked to documents in the second search results which are included as a result of inclusion of a corresponding node/document in the first search results. For example, node 314 is connected to nodes 316 and 318 because a search based on the document "Montreal ammonia leak sends 15 to hospital" of node 314 caused inclusion of documents "Ammonia leak likely cause of fire at Excel Plant," and "Eight injured at Shell refinery in France", corresponding to nodes 316 and 318, respectively.

FIG. 3 illustrates an example visualization technique that might be used by the result manager 134 and/or the view generator 110. Of course, additional or alternative visualization techniques may be used, as well. In the example of FIG. 3, it may be possible to view each underlying article by selecting a corresponding node. Also, by selecting a particular node, the graph may be rearranged to show the selected node as a starting node (i.e., to show remaining nodes in relation to the selected node as a central node).

Also, it should be appreciated that FIG. 3 illustrates selected search results, reflecting choices made by the customer 112 at earlier stages. For example, it may occur that a first search conducted based on the example document of node 304 results in several more documents than are referenced in FIG. 3 (as illustrated and described below with respect to FIG. 6), but that the customer 112 has already removed unwanted documents. For example, the customer 112 may remove unwanted documents by selecting a corresponding node, e.g., by clicking on the node or by right-clicking on the node and selecting 'remove' from a resulting drop-down list.

Figure 4:
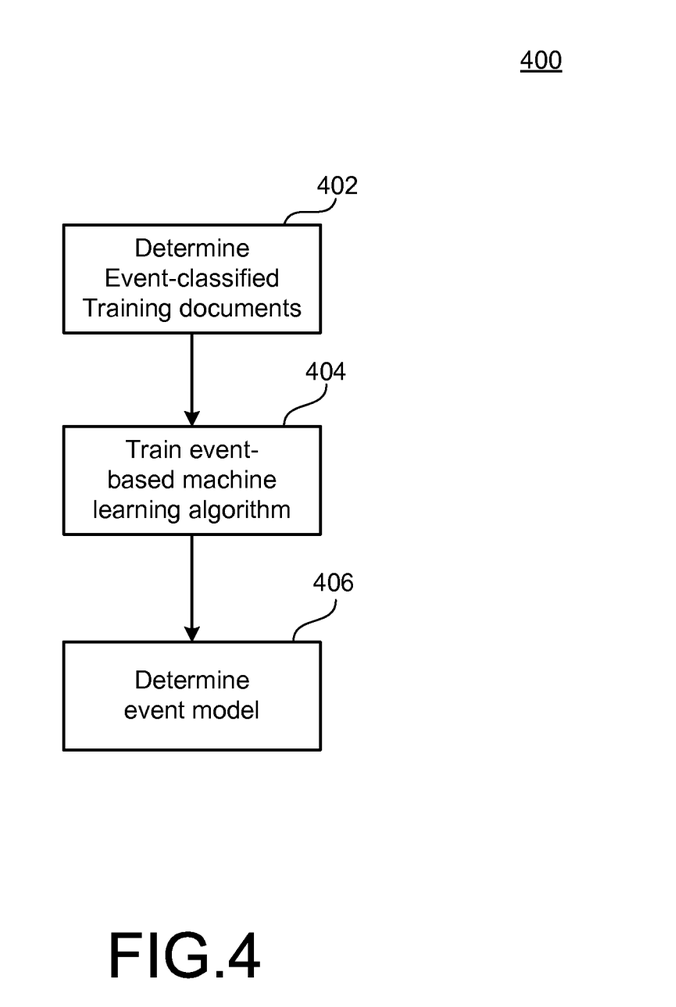
FIG. 4 is a flowchart illustrating a trained machine learning algorithm used in the system of FIG. 1.

FIG. 4 is a flowchart 400 illustrating example training techniques for training the event classifier 114, using the training set illustrated with respect to FIG. 3. In the example of FIG. 4, training of the event classifier 114 may proceed. For example, as shown, event-classified training documents may be determined (402) using the techniques described herein with respect to FIGS. 1-3, 6, and 7.

Then, training of a selected event-based machine-learning algorithm may proceed (404). As referenced above, and described in more detail below with respect to FIG. 5, such training may include an identification of appropriate features, as well as specific values thereof within the event-classified training documents. Accordingly, an algorithm may be selected that is determined to be particularly useful for operations of the event classifier 114. Moreover, a nature and type of the training to be conducted accordingly (e.g., conducted at least in part using the training module 124) may impact the type and number of event-classified training documents selected in the operation 402. By way of further example, the selected algorithm may include, e.g., the support vector machine (SVM) algorithm (including, e.g., a polynomial function (e.g., a second-degree polynomial function), or a quadratic mapping), or the radial basis function algorithm.

It may be appreciated that the selection and training of the event-based machine-learning algorithm in the operation 404 may impact the determination of the event-based training documents in the operation 402. For example, generally speaking, a larger number of features/characteristics to be considered by the event-based machine-learning algorithm will require a larger number of documents to execute the training, in order to obtain reliable and useful results. In such scenarios, for example, the graph of FIG. 3 may be extended based on additional iterations of search results. In this way, an event model may be determined (406) for use by the event classifier 114

Figure 5:
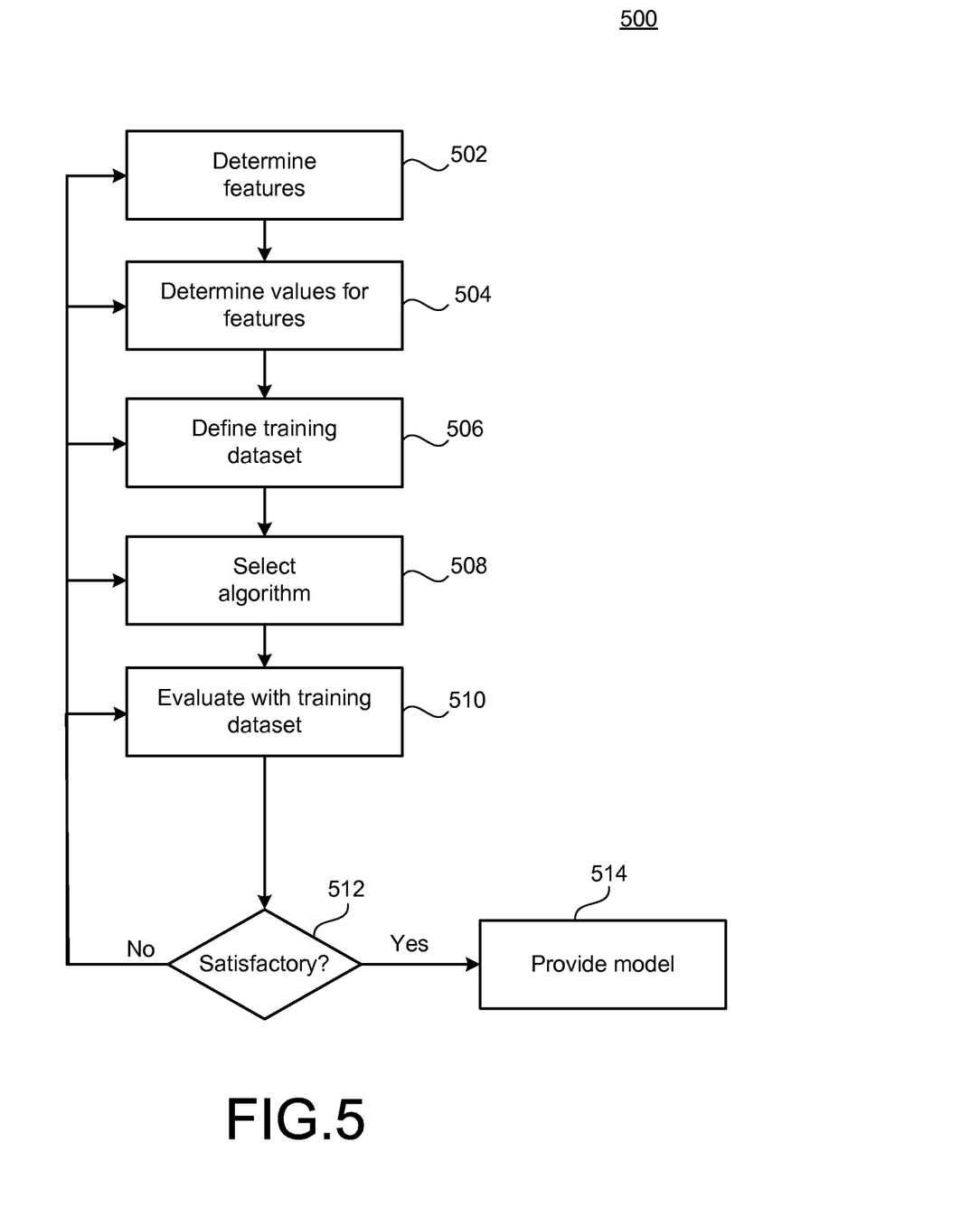
FIG. 5 is a flowchart illustrating example training techniques that may be used in the example of FIG. 4.

FIG. 5 is a flowchart 500 illustrating more detailed example operations of the training operations described in FIG. 4. That is, the operations 502-514 of FIG. 5 illustrate a general set of operations that may be used in executing training for the supervised machine-learning algorithms, which may be modified or utilized as needed to implement the various operations described above with respect to FIG. 4.

In the example of FIG. 5, features are initially determined (502). For example, a universe of possible features which may be utilized by the event classifier 114 may be selected. Various examples of such features are provided above, or would be apparent in consideration of the described functions thereof. For the event classifier 114, some of these features may include, e.g., a number of times that a potential event (e.g., a natural disaster) appears in a document, a placement of the potential event in the document, appearance of the potential event in the title, and so on.

Values for the features may then be determined (504). For example, the training documents referred to above in the context of FIGS. 1-4, and, specifically, in the example of FIG. 3 and the operation 402, may be examined to determine corresponding values for the selected features.

A training dataset may then be defined (506) from within the universe of available features and corresponding values. For example, a defined subset of the available universe of features and corresponding values for the training operation may be selected. In this regard, it will be appreciated that the selected subset defined as the training dataset may be considered to have particular predictive value with respect to correctly classifying subsequently-received input. Thus, the subset may be selected by the customer 112 based on an analysis or prediction of the customer 112 in this regard. Additionally, or alternatively, the training dataset may be selected based on feedback determined from previous uses of the same or different training dataset in conjunction with a specific supervised machine-learning algorithm.

To utilize a currently-defined training dataset, an appropriate supervised machine-learning algorithm may be selected (508). Several examples of such algorithms are referenced above. However, it may be appreciated that any appropriate current or future algorithm may be utilized. For example, single-layer or multi-layer perceptron techniques may be used, as well as their own networks, statistical learning algorithms (e.g., Bayesion networks), and/or instance-based learning. Any such algorithm, and, in some instances, combinations thereof, may be selected.

Subsequently, the selected algorithm may be evaluated with the previously-selected training dataset (510). That is, the evaluation will determine, for each training document or training match, whether the applied, selected algorithm results in a correct or useful prediction. For example, a training document used in training the event classifier 114 may be classified for training purposes as relating to an event "natural disaster." The evaluation of this training document for the feature "natural disaster," using the selected algorithm, may or may not result in a correct classification of the training document, i.e., may or may not result in the training document being correctly labeled with the label "natural disaster."

More generally, during the evaluation, it may occur that a false negative occurs in which a training document or training match that should be classified in a certain manner, is in fact failed to be classified as such. In such cases, the consumer 112 would hypothetically be incorrectly deprived of receiving a correctly-classified document or match. On the other hand, the evaluation may result in a false positive, in which a document or match is classified as being correct, when in fact, no such classification should have been determined.

Therefore, for these and other reasons, a determination as to whether the evaluation is satisfactory (512) may generally depend on a number of situation-specific factors. For example, if the customer 112 is in a situation in which false positives are not considered to be particularly damaging, then a prediction algorithm may be selected which is relatively more inclusive with respect to determining a presence or inclusion of relevant classifications. For example, in such cases, the event classifier 114 would be more likely to include a relatively larger number of assigned event labels. Conversely, of course, different selected algorithms in each case, or different parameters therefor, may be selected to obtain the opposite result, i.e., relatively less inclusive classifications, such as in cases in which false positives are considered to be particularly damaging to a decision-making process of the customer 112.

As shown in FIG. 5, if the evaluated training set is considered not to be satisfactory (512), then any of the previous operations 502-510 may be revisited and adjusted. For example, different features and corresponding values may be selected (e.g., different training documents may be selected), and a modified training set may be selected therefrom. Of course, in separate iterations, different algorithms may be selected. Further, in the evaluations thereof, various parameters (e.g., a tolerance for false positives and/or false negatives, as referenced above) may be specified. Once an evaluation has been deemed satisfactory (512), the corresponding model may be provided (514), such as, e.g., the document fitness model, the event model, the supplier match model, or the relevance model.

It may be appreciated that the training techniques described above with respect to FIG. 5 may apply to training the event classifier 114 in general, with respect to all event types of a corresponding event model. In this regard, a newly-created event type that is created using the techniques of FIGS. 1-3, 6, and 7 may simply be included in the training process in a straight-forward and seamless fashion.

FIG. 6 is an example of a news article that may be utilized by the system of FIG. 1, together with corresponding search results, which may be used to generate the search result graph of FIG. 3. In the example of FIG. 6, an article 602 represents an example article and corresponds to the example article of the node 304 in FIG. 3.

As explained in more detail below with respect to FIG. 7, referenced article listings of FIG. 6, listed by date and article title, refer to search results obtained by the event type generator 116 of FIG. 1, using the example document 602. Therefore, article listings 306, 308, 310, 312, and 314 correspond to similarly-numbered nodes in FIG. 3, for the sake of clarity and consistency. Meanwhile, article listings 604, 606, 608, and 610 correspond to article listings which were included in initial search results as being potentially similar, but which were not selected by the customer 112 for use in subsequent search iterations.

Figure 7:
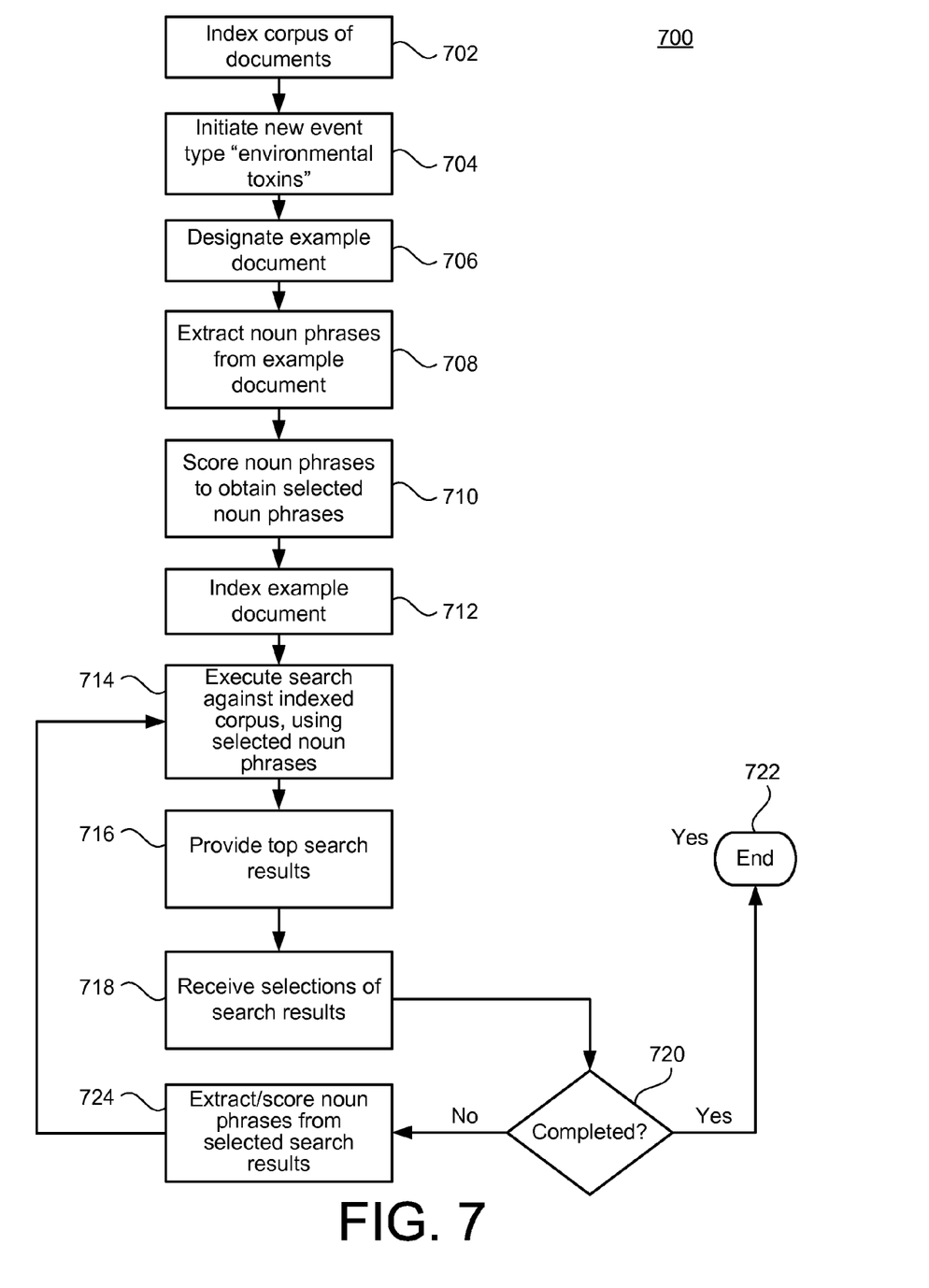
FIG. 7 is a flowchart of more detailed example implementations of the system of FIG. 1.

FIG. 7 is a flowchart of more detailed example implementations of the system of FIG. 1, with reference to FIGS. 3 and 6, and continuing examples in which the extracted entities include noun phrases. In the example of FIG. 7, the corpus 122 of documents is indexed (702), to obtain the entity index 120. That is, as described in the above examples, the corpus 122 may be indexed using extracted noun phrases obtained from individual documents therein.

At some future time, the customer 112 may wish to initiate creation of a new event type (704), as in the examples above of the new event type "environmental toxins." Thus, the customer 112 may use interactive fields provided by the request handler 128 and the view generator 110 to enter the new event type, and, in conjunction therewith, to submit or otherwise identify or designate a corresponding example document (706). For example, the customer 112 may designate the example document 602 of FIG. 6, corresponding to the node 304 of FIG. 3.

Then, the text analyzer 130 may proceed to extract noun phrases from the example document (708). The entity selector 132 may then score the extracted noun phrases to obtain selected noun phrases (710). As described above, the scoring/selecting may include related processing of the noun phrases designed to optimize the search to be performed by the search engine 118. For example, the entity selector 132 may designate certain noun phrases as having higher weight(s) relative to other noun phrases for purposes of the search. In a specific example, using the Inverse Document Frequency (IDF) technique, noun phrases which are relatively rare may be given more weight than more frequent noun phrases, on the theory that the rarer noun phrases are more distinguishing and more likely to result in relevant search results. Additionally, or alternatively, Information Retrieval and Information Gain search term scoring methods may be used to optimize the search(es) to be performed.

The example document itself may be added to the entity index 120 (712). In this way, the example document becomes available for future use in creating new event types.

A first search iteration may then be executed with respect to the corpus 122, executed by the search engine 118 at the direction of the result manager 134 (714). The top search results may then be provided (716) by the result manager 134. For example, a number (e.g., 10 or 20) of results may be returned, or a designated percentage of results may be returned. With reference to FIG. 6, then, the various article listings 306-314, and 604-610 represent such search results. In providing the top search results, the visualization of FIG. 3 may be used, e.g., all of the article listings 306-314 and 604-610 might be displayed with respect to corresponding nodes included in an initial version of the graph of FIG. 3, and initially connected to the node 304.

In this way, for example, selections of search results may be received (718). For example, the result manager 134 and/or the view generator 110 may be used to receive selections of nodes of such an initial version of the graph of FIG. 3 to receive selections of nodes therein corresponding to the article listings 606-610. Conversely, of course, the customer 112 may designate nodes 306-314 for inclusion, whereupon remaining nodes 606-610 may be automatically removed as being non-included.

The review and selection might be completed in a current iteration (720), whereupon the process would end (722). However, assuming at least two iterations, the process would then proceed to scoring/selecting noun phrases from the selected search results (724), using the text analyzer 130 and the entity selector 132.

Then the process may continue with execution of a second search against the indexed corpus 122 (714), and subsequent providing of the top results thereof (716). For example, at this point with respect to FIG. 3, the top results might be illustrated with respect to new nodes being displayed, where, as described and illustrated, a node representing a document deriving from a specific, existing document will be connected to that node in a parent/child relationship.

Then, again, the customer 112 may select (or de-select) from among these provided second search results (718), which would thus result in the example of FIG. 3, as illustrated. If halt criteria has been satisfied for completion at this point (720), then the process may end (722). For example, as referenced, such halt criteria may include reaching a maximum number of iterations, reaching a maximum number of selected search results, or running out of available search results with respect to the corpus 122.

As a result of operations associated with FIG. 7, and in conjunction with separate, subsequent training techniques as described with respect to FIGS. 4 and 5, it may be appreciated that the record generator 102 of FIG. 1 may subsequently generate a corresponding supplier record to be included within the supplier records 108, including supplier records that have been labeled or otherwise classified with respect to the newly-created event type. As referenced, in this way, the supplier records 108 represent a large number of supplier-specific data records, which may be utilized by the system 100, e.g., by the supplier review module 126, to provide the customer 112 with timely, useful information regarding the suppliers 106.

Figure 8:
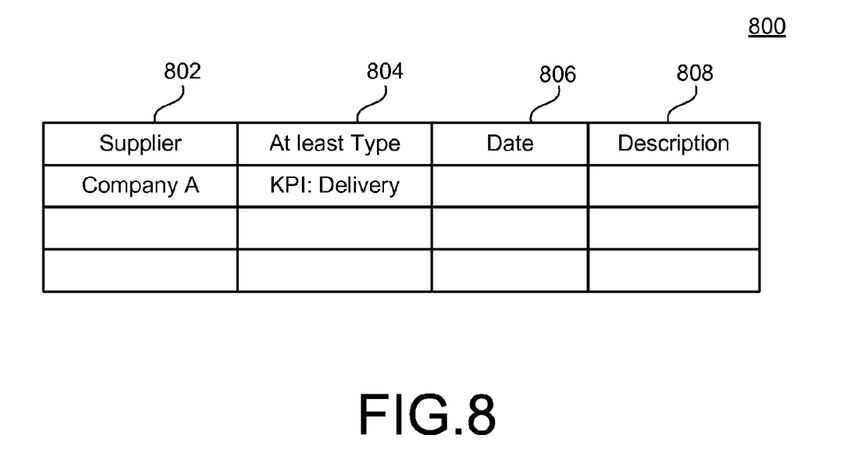
FIG. 8 is an example of an alert provided by the system of FIG. 1.

By way of illustration, FIG. 8 illustrates an example graphical user interface 800 which may be provided by the supplier review module 126 to the customer 112. Specifically, as shown, the user interface 800 includes a column 802 for individual suppliers of the suppliers 106, a column 804 indicating a type of alert detected for the supplier of the column 802, as well as columns 806, 808 which include, respectively, a date of the alert and a description of the alert. Of course, it may be appreciated that various other additional or alternative columns may be included in the example user interface 800.

In the example of FIG. 8, the supplier column 802 identifies a specific company, company A. Meanwhile, the column 804 identifies an alert type related to a key performance indicator (KPI) of "delivery." Of course, although not specifically illustrated in FIG. 8, it may generally be appreciated that many other individual suppliers, associated alerts, and corresponding dates and descriptions could be included within the user interface 800.

Nonetheless, the simplified example of FIG. 8 illustrates an example manner in which the customer 112 may benefit from the information available within the supplier records 108. That is, as shown, the customer 112 may be provided with information regarding individual suppliers, where such information has been extracted from available information sources 104, and provided to the customer 112 in a convenient manner. For example, in situations where the customer 112 represents an individual responsible for monitoring the performance of the suppliers 106, the individual customer 112 may arrive at work and may immediately be provided with information such as that shown in FIG. 8, based on individual documents that the individual customer 112 may not otherwise have reviewed.

Thus, in the example, the individual customer 112 is immediately provided with an ability to identify and analyze operations of the identified supplier. In this way, for example, the individual customer 112 may determine a specific problem associated with the identified supplier, which may have affected, e.g., a timeliness of deliveries associated with that supplier. Then, for example, the individual customer 112 may immediately determine whether such problems may be temporary or more systematic, and they make an intelligent decision, for example, as to whether a substitute supplier should be used. Without the availability of such information, the individual customer 112 may not otherwise be aware of potential delivery problems, until, for example, an actual delivery is not delivered, or is delivered late. By such time, it may be substantially more difficult for the customer 112 to maintain the timeliness of a larger supply chain, and to otherwise maintain a consumer satisfaction level.

Figure 9:
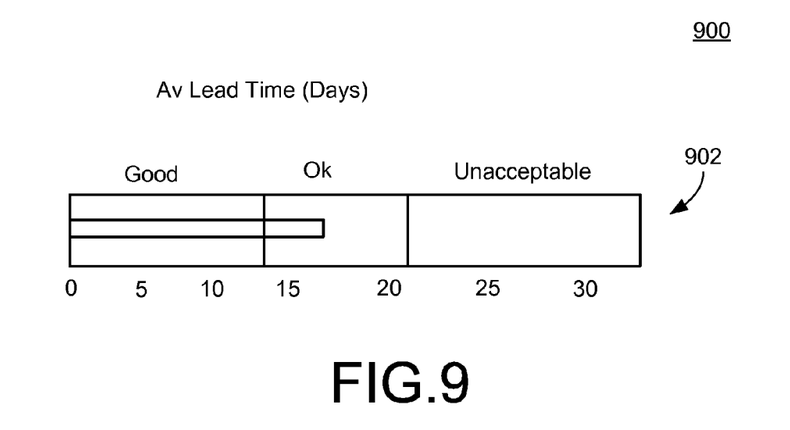
FIG. 9 represents a graph that may be used to evaluate the alert of FIG. 8.

FIG. 9 is a second example user interface 900, illustrating the ability of the supplier review module 126 to provide the customer 112 with a benchmarking of an identified supplier against other ones of the suppliers 106. In the example of FIG. 9, a graph 902 illustrates an average lead time, in days of relevant or similar suppliers. As shown, the chart 902 illustrates a good, okay, and unacceptable range(s) of average lead time for deliveries. In the example, a bar 904, the average lead time for the company A of FIG. 8 is within the "okay" range, as compared to other relevant ones of the suppliers 106.

Of course, many other types of benchmarks may be selected for providing to the customer 112, e.g., in conjunction with a number of other known types of KPIs which may be used to classify alerts regarding individual suppliers. It may be appreciated that all such metrics and related factors may benefit from the techniques described above with respect to FIGS. 1-7. That is, as described, the customer 112 may be provided with such information and related metrics, in a manner that is fast, efficient, and accurate, and that relies on a minimum of involvement from the customer 112 or other users.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
    At least one processor; and
    A non-transitory computer-readable storage medium configured to store instructions executable by the at least one processor, the system further including:
    An event type generator configured to cause the at least one processor to provide a training set for training a supervised machine learning algorithm to classify documents with respect to an event type, the even generator including
    A request handler configured to receive the event type and at least one example document designated as being associated with the event type;
    A text analyzer configured to extract first entities from the at least one example document; and
    A result manager configured to execute to first search against an indexed corpus of documents, using the first entities, to obtain first search results, and further configured to receive at least one selected document from the first search results,
    Wherein the request hander is further configured to extract second entities from the at least one selected document, and execute a second search against the indexed corpus of documents, using the second entities, to obtain second search results, and
    Wherein the event type generator is further configured to provide the at least one example document, the first search results, and the second search results as the training set,
    Wherein the event type generator is configured to provide the training set in an iteration fashion, in which the at least one selected document and the second search results represent the first two iterations thereof, and in which iterations are halted when a corresponding halt criteria is satisfied, and
    Wherein the system further comprises a record generator configured to cause the at least one processor to receive a plurality of documents associated with a plurality suppliers, the second generator including an event including an event classifier configured to execute a supplier-independent, event-based classification of each with respect to the event type, wherein the record generator is further configured to cause the at least one processor to provide supplier-specified data records, based on the event-based classification, and generate a graphical view of a selected supplier with respect to at least one performance indicator, in conjunction with a at least one corresponding supplier-specific data record.

2. The system of claim 1, wherein the text analyzer is configured to select the first entities and the second entities to optimize the first search results and the second search results, respectively.

3. The system of claim 1, wherein the result manager is configured to display the first search result in connection with the example document and further configured to remove non-selected search results from the display, based on the at least one selected document.

4. The system of claim 1, wherein the indexed corpus of documents is indexed using an entity index.

5. The system of claim 4, wherein the event type generator is further configured to index example within indexed corpus of document, including indexing the example document within the entity index, based on the first entities.

6. The system of claim 1, wherein the halt criteria includes one or more of a maximum number of iteration, or a maximum number of selected search results.

7. The system of claim 1, wherein selection of the second search result is received from among initial second search results provided in conjunction with the at least one selected document from the first search results.

8. The system claim 1, wherein the first entities and the second entities include first noun phrase and second noun phrases, respectively.

9. A computer-implemented method for executing instructions stored on a computer readable storage medium, the method comprising:
    receiving an event type and at least one example document designed as being associated with the event type;
    extracting first entities from the at least one example document;
    executing a first search against an indexed corpus of documents, using the first entities, to obtain fires search results;
    receiving at least one selected document for the first search results;
    extracting second entities from the at least one selected document;
    executing a second search against the indexed corpus of documents, using the second entities, to obtain second search results;
    providing the at least one example document, the first search results, and the second search results as a training sets for training a supervised machine learning algorithm to classify document with respect to the event type, further including providing the training set in an iterative fashion, in which the at least one selected documents and the second search results represent the first two iterations thereof, and in which iterations are halted when a corresponding halt criteria is satisfied;
    receiving a plurality of the document associated with a plurality of suppliers,
    executing a supplier-independent, event-based classification of each document with respect to the event types;
    providing supplier-specific data records, based on the event-based classification; and
    generating a graphical view of a selected supplier with respect to at least one performance indicator, in conjunction with at least one corresponding supplier-specific data record.

10. The method of claim 9, wherein the indexed corpus of documents is indexed using an entity index.

11. The method of claim 9, wherein selection of the second search results is received from among initial second search results provided in conjunction with the at least one selected document from the first search results.

12. A computer program product, the computer program product being tangibly embodied on a non-transitory computer-readable storage medium and comprising instructions that, when executed by at least one processor, are configured to:
receive an event type and least one example document designated as being associated with the event type;
extract first entities from the at least one example document;
execute a first search against in indexed corpus of document, using the first entities, to obtain first search results;
receive at least one selected document from the first search results;
extract second entities from the at least one selected document;
execute a search against in indexed corpus of document, using the second entities, to obtained second search results;
provide the at least one example document, the first search result, and the second search results as a training set for training a supervised machine learning algorithm to classify documents with respect to the event type, further including providing the training set in an iterative fashion, in which the at least one selected document and the second search results represent the first two iterations thereof, and in which iterations are halted when a corresponding halt criteria is satisfied;
receive a plurality of documents associated with a plurality of suppliers;
execute a supplier-independent, event-based classification of each document with respect to the event type;
provide supplier-specific data records, based on the event-based classification; and
generate a graphical view of a selected supplier with respect to at least one performance indicator, in conjunction with at least one corresponding supplier-specific data record.

13. The computer program product of claim 12, wherein the indexed corpus of documents is indexed using an entity index.

14. The computer program product of claim 13, wherein the example document is indexed within indexed corpus documents, including indexing the example document within the entity index, based on the first entities.

15. The computer program product of claim 12, wherein the first entities and the second entities include first noun phrases and second noun phrases respectively.

* * * * *